July 24, 1934.  S. EGGLESTON  1,967,747
CONVEYER
Filed March 6, 1933   3 Sheets-Sheet 1

INVENTOR.
SMITH EGGLESTON,
BY Duell, Dunn & Anderson
ATTORNEYS.

July 24, 1934.  S. EGGLESTON  1,967,747
CONVEYER
Filed March 6, 1933   3 Sheets-Sheet 2
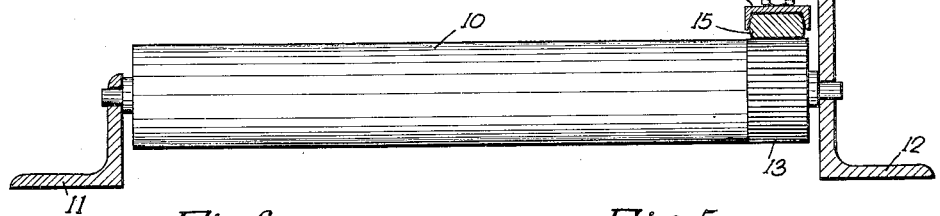
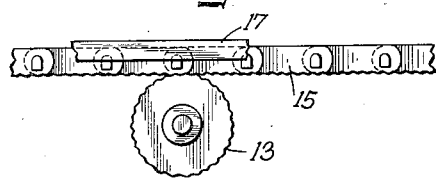
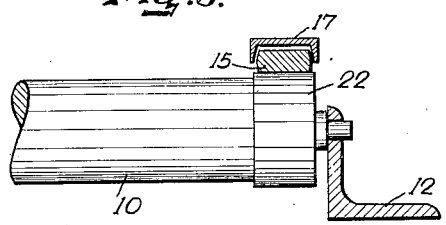
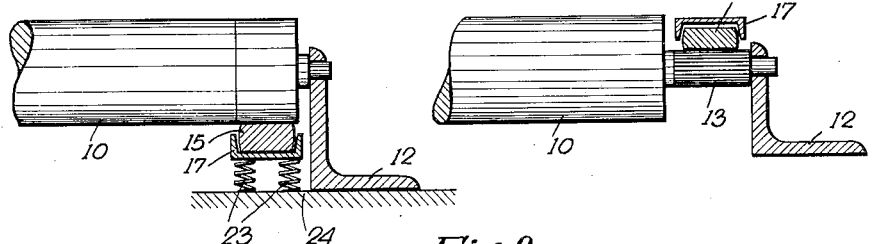
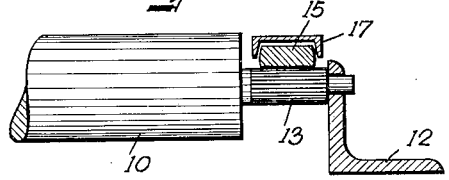
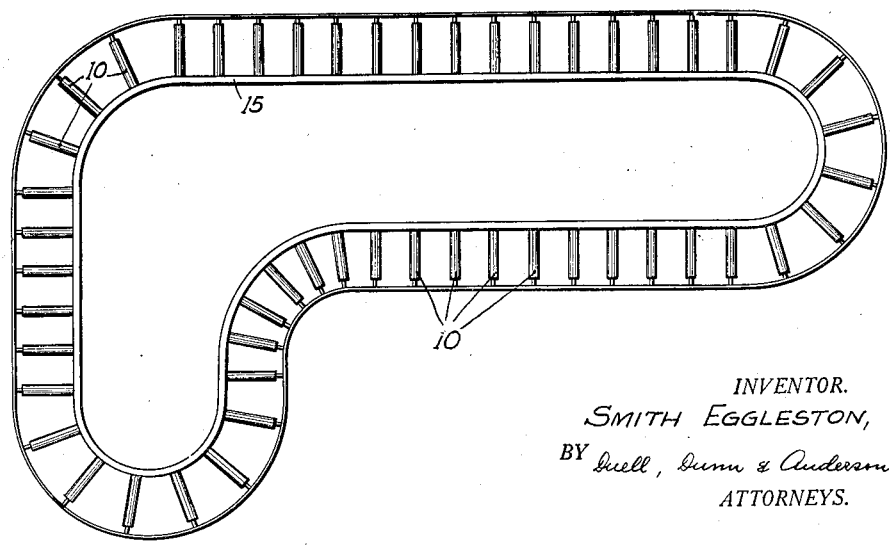
INVENTOR.
SMITH EGGLESTON,
BY Duell, Dunn & Anderson.
ATTORNEYS.

July 24, 1934.  S. EGGLESTON  1,967,747
CONVEYER
Filed March 6, 1933   3 Sheets-Sheet 3
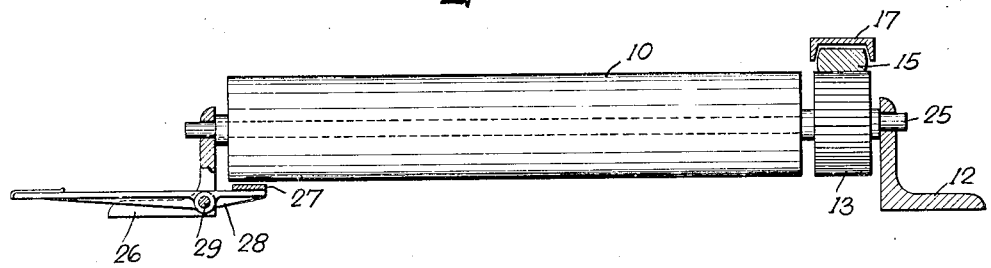
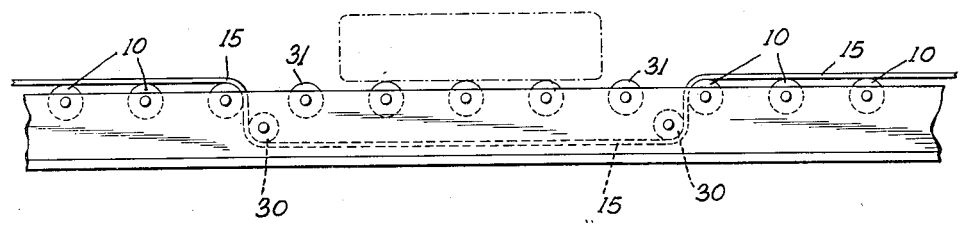
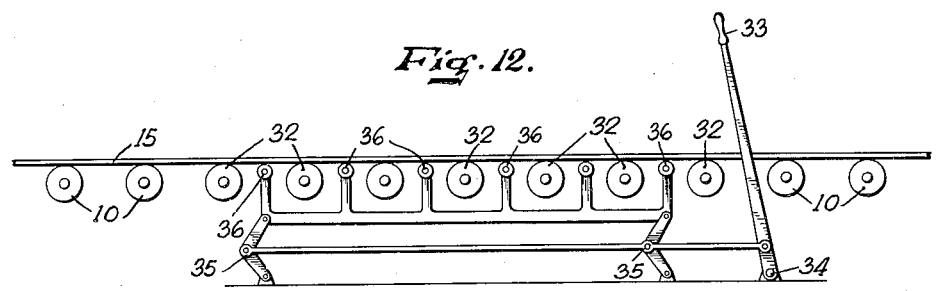
INVENTOR.
SMITH EGGLESTON,
BY Duell, Dunn & Anderson.
ATTORNEYS.

Patented July 24, 1934

1,967,747

UNITED STATES PATENT OFFICE 1,967,747

CONVEYER

Smith Eggleston, St. Paul, Minn., assignor to Standard Conveyor Company, North St. Paul, Minn.

Application March 6, 1933, Serial No. 659,864

8 Claims. (Cl. 198—127)

This invention relates to conveyers and relates more particularly to conveyers in which live rollers are used to convey the medium to be transported.

Live roller conveyers have been used in the past for conveying articles in the process of manufacture, for example, from one stage to another. Such conveyers were best adapted for transporting articles from point to point in a straight line. Straight line conveyers, while satisfactory for many manufacturing operations, are not suited for others, as, for example, where it is desired that an article under transport be acted upon by different units of numerous machines which are not in line. While in the past straight run conveyers and curved run conveyers have been combined, it has been necessary to utilize expensive and complicated connections between the straight and curved sections. Furthermore, with the previous arrangements, when it was desired to stop an article being transported, it was necessary to stop the entire conveyer in order that the article would come to rest at the desired location.

An object of this invention is to drive live rollers in a conveyer with a flexible chain which is flexible in all directions.

Another object of the invention is to combine, in a live roller conveyer, straight and curved sections without expensive inter-connections.

Another object of the invention is to provide a universal live roller conveyer which may have any irregular shape.

Another object of the invention is to rotate the rollers of a live roller conveyer with a single flexible chain.

Another object of the invention is to provide a live roller conveyer, one or more rollers of which could be stopped, as desired, without affecting the movement of the other rollers.

Another object of this invention is to provide a live roller conveyer, certain areas of rollers of which could be stopped without stopping the movement of the conveyer as a whole.

Another object of the invention is to provide means for stopping an article being transported on a live roller conveyer, at a desired location, without stopping the conveyer.

Another object of the invention is to drive the rollers in a live roller conveyer by means of a flexible chain and to control the movement of individual rollers.

Live roller conveyers have been used in the past for a number of purposes. Conveyers of this type comprise a plurality of rollers arranged, for example, in a horizontal plane, which are driven by a belt or chain, and articles in different stages of manufacture are carried by movement of the rollers from one roller to the succeeding one. Such conveyers have been used in foundries, in creameries, breweries, in bottling works, and in other industrial plants. In such plants, were straight line conveyers alone used, the amount of space required would be too great since all of the equipment acting on an article under transport would have to be in alignment. Accordingly, live roller conveyers having both straight and curved portions have been provided, but, in the past, the straight and curved sections have had to be combined through the use of expensive connections. Also, in industrial plants, where an article is being transported by a live roller conveyer, it often becomes necessary to stop the article under transport at a particular location in order that it may be removed at that location, or a manufacturing operation can be there performed. For example, in foundries, moulds are conveyed along a conveyer and are stopped at a particular point to receive or discharge the molten metal. Heretofore, in order to stop a mold at the desired point, it has been necessary to stop the entire conveyer.

According to a feature of this invention, a live roller conveyer having any irregular shape is provided, the rollers being rotated by contact with a flexible chain which is universally flexible both horizontally and vertically.

According to another feature of this invention, a live roller conveyer is provided which does not depend upon actuating rollers for necessary contact between the belt and the bottom of the carrying rollers. According to this invention, a flexible chain drive is provided, the necessary driving contact being provided by the weight of the chain when used for driving the rollers from above, or by a spring compressed guide when driving the rollers from underneath.

According to another feature of this invention, a live roller conveyer is provided, any one roller or any particular group of rollers of which may be stopped at will, without stopping the movement of the conveyer as a whole. This results in the ability to stop an article under transport without stopping the conveyer, and, of course, discontinuing the movement of other articles on other portions of the conveyer.

In one embodiment of the invention, the live rollers are driven by frictional contact with a flexible chain, and the movement of a particular group of rollers, at the location that it is desired that the article under transport be stopped, is prevented by separating the driving chain and the rollers, the movement of which it is desired to prevent.

In another embodiment of the invention, at pre-determined points, the driving means is by-passed around a particular group of rollers at the location where it is desired that the article under transport be stopped, the article coming to a rest on these rollers which are dead rollers at all or particular times, the article thereon being, when it is desired that it move again, pushed bodily onto adjoining live rollers which are driven by the means which is by-passed around the other rollers.

The invention will now be described with reference to the drawings, of which:

Fig. 4 is a side view of another form of live roller used in a conveyer according to this invention;

Fig. 5 is a partial side view of another live roller used in a conveyer according to this invention;

Fig. 6 is an end view of the roller shown by Fig. 4;

Fig. 7 is a partial view of another view of a live roller conveyer, according to this invention, and is similar to Fig. 5, except that, whereas in Fig. 5 the roller is driven from above by means of the flexible chain, the roller of Fig. 7 is driven from underneath by a flexible chain;

Fig. 8 is a side view of another form of roller of a live roller conveyer, according to this invention, the driving portion of the roller being cut down so that the driving chain and guide are in planes below the surface of the roller in order that articles under transport may be removed over the driving mechanism;

Fig. 9 is a plan view looking down upon a live roller conveyer, according to this invention, of the shape of a carrousel conveyer for use in foundries, for example;

Fig. 10 is an end of a roller, similar to that of Fig. 5, with additional means provided for braking the roller to prevent movement;

Fig. 11 is a side view of a portion of a live roller conveyer with the driving chain by-passing a group of dead rollers, and Fig. 12 is a side view of a live roller conveyer, the rollers of which are driven by frictional contact between a driving chain and the surface of the rollers, together with mechanism for separating the driving chain from a particular group of rollers so as to render them inactive, as desired.

Live roller conveyers according to this invention can be of two types—the horizontal plane type, such as shown by Fig. 9, where the live rollers and their driving chain are placed in horizontal planes, or they may be of the more ordinary conveyer type where the driving chain is returned in vertical loop action underneath the conveying rollers. It should be understood, therefore, that the embodiments now to be described are applicable to both types.

Figure 1:
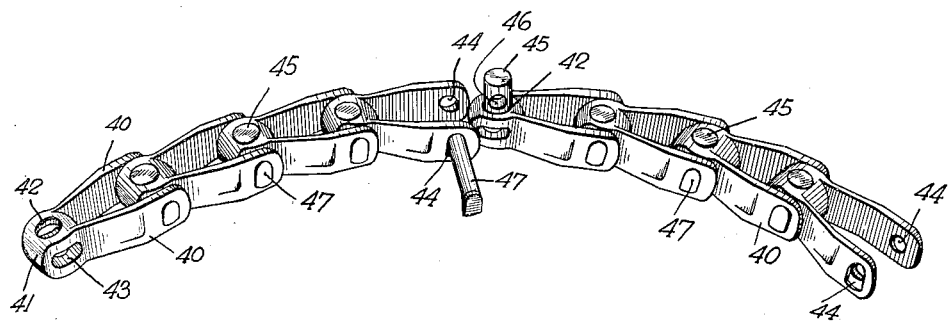
Fig. 1 is a projected view of a universal, flexible chain, according to this invention, which may be used for driving the live rollers.

Referring now to Fig. 1, the flexible chain rotating live rollers, in a live roller conveyer, according to this invention, will now be described. The flexible chain comprises the pairs of links 40, each pair of links being joined together at one end 41, which end has a vertically placed cylindrical opening 42 and a horizontally placed opening 43. The other ends of the pairs of links are provided with the horizontally placed openings 44. The vertically placed opening 42 is adapted to receive the barrel 45 which is preferably of a suitable self-lubricating material. The pairs of links are joined together by placing the openings 44 of one pair in alignment with the openings 43 of another pair, and placing the barrel 45 in position so that its horizontally placed opening 46 is in alignment with openings 43 and 44. Then the closure member 47 is inserted through the openings 44, 43, and 42 to connect the pairs of links together. It is to be noted that with this construction the chain is universally flexible and the pairs of links move relative each other about the closure member as a pivot and also about the barrel 45 as a pivot. This type of flexible chain is used, according to this invention, to rotate the carrying rollers of a live roller conveyer by frictional contact therewith. How this is done will now be explained with reference to Figs. 4 and 6.

Referring now to Figs. 4 and 6, the live roller 10 is mounted between the two angle plates 11 and 12. One end of the roller may have a knurled portion 13 with which the flexible chain, indicated generally by 15, engages by frictional contact. This flexible chain may be notched or knurled, as shown by Fig. 6, to correspond with the notches or knurling of the knurled portion 13 of the roller. The great advantage of this flexible chain drive is that a single, flexible chain may be used on both the horizontal and curved sections of a live roller conveyer. This is due to the flexibility of the driving chain in a horizontal plane, as well as in a vertical plane. A type of live roller conveyer combining straight and curved sections is shown by Fig. 9.

The self-lubricating barrels 45 (Fig. 1) provide automatic lubrication for the links of the chain.

The flexible chain 15 may be driven by any suitable power source in the usual manner, and, under ordinary conditions, the weight of the chain alone in the driving positions, as shown by Figs. 4 and 6, for example, will suffice to provide the necessary driving traction. In some installations, however, it may be desired to provide additional traction. This may be accomplished as by causing the guide 17 to exert downward pressure on the chain 15 by means of the spring 18 which is compressed between the upper portion 19 of the channel member 12 and the upper portion of the guide member 17. The tension of this spring may be adjusted by positioning the nut 20 upon a threaded portion of the bolt 21 around which the spring 18 is placed.

It is seen that with the form of drive, according to this invention, no actuating rollers or idlers are required for obtaining the necessary contact between the driving medium and the surfaces of the live or carrying rollers.

Fig. 5 illustrates another embodiment of a live roller, arranged according to this invention. In this embodiment, one end of the roller is provided with a superimposed rubber hose, or fabric, or other non-metallic material 22, which may be either cemented in or vulcanized directly to the roller. In this case, the driving chain need not be notched or knurled, since sufficient friction will exist between the chain and the portion 22 to insure sufficient traction. This embodiment will probably be used where quietness of operation is desired or essential. In some cases, this non-metallic material may be used to gain added frictional contact between the chain and roller. That may be in some cases, for example, where unusually heavy articles are being carried, or where some other unusual condition makes it desirable that a greater contact be had than would normally result between two metal surfaces.

Fig. 7 illustrates another embodiment of the invention, the operation of which is similar to that described in connection with Figs. 4, 5 and 6, except that the driving chain 15 is applied to the under side of the roller 10, the chain 15 being held in engagement with the end of the roller by the action of the springs 23, which are in compression between the base 24 and the guide 17. Of course, the same effect may be had by merely slotting the side frame angles for the shaft ends, which would permit the rollers to rest directly on the chain, thus assuring proper contact when an article is on the roller, but exerting the weight of only the roller itself when the conveyer is empty. This slotting would occur in one side frame only, this being the side where the chain is flexed. Of course, it may be desirable in some cases to have the chain in the center of the roller instead of the end and, in that case, the slotting would occur in both frame angles. This under drive may be preferable where it is desired to divert the object being conveyed, as desired, from either side of the conveyer. In this embodiment, the driving mechanism being underneath, no obstructions are placed in the path of divertence.

Fig. 8 illustrates another embodiment of the invention, differing from the preceding embodiments in that it is adapted to permit diverting on the chain side without having the driving chain on the under side of the roller. In this embodiment, the driving portion 13 of the roller, which may or may not be knurled, as desired, comprises a reduced roller end which may be formed integrally with the roller, may be a separate casting, or a separate pressed steel part. In this embodiment, the driving chain and guard are all below the upper surface of the rollers, thus permitting the article being conveyed to be diverted thereover.

Fig. 9 is a plan view of a carrousel type conveyer comprising a plurality of live rollers 10, driven by the flexible chain 15, placed along the inner ends of the rollers and in frictional contact therewith. This figure is intended to show how the roller may be arranged to convey an article along a curved path in a horizontal plane, and the driving mechanism has been omitted since the essential details of same are well known and it forms no part of this invention.

Fig. 10 illustrates another embodiment of a live roller, according to this invention, wherein an arrangement similar to a roller slat is provided. The driving portion 13 of the roller is fixedly mounted on the shaft 25, while the conveying portion of the roller 10 is loosely mounted on the shaft 25. With this arrangement the revolving shaft normally turns the roller 10, causing it to be a live roller. Then the conveyer portion of the roller may be stopped by frictional engagement with the brake mechanism 26, or by the lifting of the driving chain 15 from the driving portion 13 of the roller, as will be described later in connection with Fig. 12. The brake mechanism 26 comprises the frictional brake material 27 mounted on one end of the lever 28, which is pivotally mounted at 29, and the other end of which is adapted to be depressed at will to swing the braking material into contact with the roller.

Fig. 11 illustrates another embodiment of the invention where both live rollers and dead rollers are provided in a conveyer. In this embodiment, the live rollers 10 are driven by the flexible chain in the manner previously described, but the driving chain is snubbed down and then up again around the guide rollers 30, thus by-passing the other rollers 31 on which the article 32, under transport, may be brought to rest for the performance of a manufacturing operation, or for removal from the conveyer.

Fig. 12 illustrates another embodiment of the invention where a particular group of rollers of a live roller conveyer may be rendered temporarily inactive in order that an article under transport may be halted at a desired point to permit a manufacturing operation, or to permit its removal. In this embodiment, the flexible chain drives the rollers 10, as has previously been described. In order that a particular group of rollers 32, in the area of which it is desired that the article under transport be brought to rest, or to be rendered inactive, at will, means is provided for separating the driving chain from the rollers 32, at will, in order that the rollers 32 may be active or inactive, as desired. This means may comprise the lever 33, which is pivoted at 34 and actuates toggle mechanism 35 to raise or lower the rollers 36. Normally, the lever and rollers would remain in the position shown in the drawings, the conveyer rollers 32 then being live rollers. When it is desired that the rollers 32 become inactive, the lever is pulled back and the toggle mechanism acts to raise the small rollers 36, which lift the driving belt 15 from the conveying rollers 32, thus removing the driving force from the conveying rollers, the conveyer resting instead upon the small rollers 36 in the area of the rollers 32.

Obviously, the arrangement shown by Fig. 12 could be adapted to separate the driving chain from rollers which are driven from their under side, as shown by Fig. 7.

Figure 2:
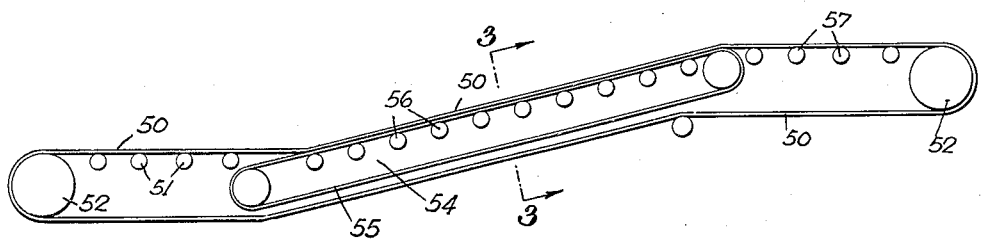
Fig. 2 is a diagrammatic representation of a combination chain and belt driven live roller conveyer.
Figure 3:
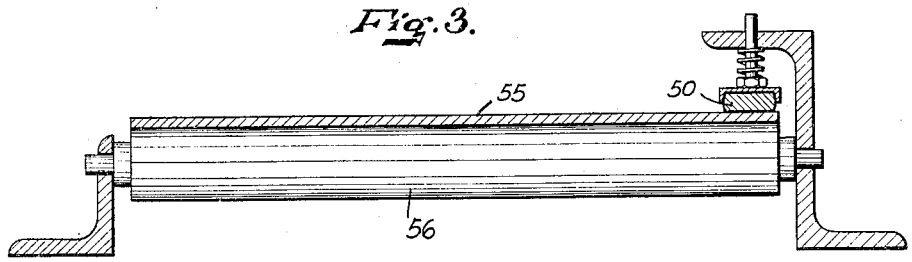
Fig. 3 is a side view partially in section of a live roller conveyer, according to this invention.

Figs. 2 and 3 illustrate another embodiment of a conveyer according to this invention. The embodiment illustrated is a combination live roller and belt conveyer. The flexible chain 50 drives the live rollers 51, the chain being driven and returned in the usual manner by the drives 52. The ordinary belt conveyer 54 is interposed in the inclined portion of the conveyer combination, the belt 55 passing over the rollers 56 and being contacted with by the chain 50, as shown more clearly by Fig. 3. This combination may be desirable where extreme degrees of inclination of travel are required. It is seen that in this embodiment an ordinary fabric or rubber belt, or any special non-slip belt is laid between the driving chain and the rollers on the inclined portions of the conveyer.

While the conveyer has been illustrated as operating in a single plane, carrying objects to be transported in one direction, a two-way conveyer, where articles under transport can be carried on both its upper and lower portion, may be provided, according to this invention.

Likewise, while one or more types of conveyers have been described, obviously conveyers having any desired shape or running in any desired direction may be provided, according to this invention. Furthermore, this invention may be used in connection with roller spirals. For down travel, the purpose would be to control speed. One difficulty with roller spirals is high speed when the weight of the commodities and other conditions are such that the pitch or drop-around must be excessive. The speed of a roller spiral, according to this invention, would be under positive control. Of course, the commodities could be elevated as well as carried downwardly. Furthermore, the live roller conveyer, according to this invention, may be provided for combination declines and inclines, or for combination of both or either, with both curved sections or straight runs.

While several embodiments of the invention have been described for the purpose of illustration, it should be understood that the invention is not limited to the details described, but many departures may be made by those skilled in the art without departing from the spirit of the invention.

What is claimed is:

1. A conveyer system comprising a plurality of live rollers, a driving chain having a plurality of links having flattened surfaces in frictional contact with the outer surfaces of said rollers for rotating same, and spring actuated means for increasing the degree of frictional contact between said chain and one of said rollers.

2. A conveyer system comprising a plurality of live rollers, means for driving said rollers, comprising a driving chain having a plurality of links having flattened surfaces in frictional contact with the outer surfaces of said rollers, and means for disconnecting said means from one or more of said rollers at will.

3. A conveyer system comprising a plurality of live rollers, means for driving said rollers, comprising a driving chain having a plurality of links having flattened surfaces in frictional contact with the outer surfaces of said rollers, and means for disconnecting said means from a predetermined group of said rollers at will.

4. A conveyer system comprising a plurality of live rollers, means in frictional contact with said rollers, comprising a driving chain having a plurality of links having flattened surfaces in frictional contact with the outer surfaces of said rollers, for rotating same, and means for separating said driving means from a predetermined group of said rollers at will.

5. A conveyer system comprising a plurality of live rollers, a flexible chain having a plurality of links with flattened surfaces in frictional contact with the outer surfaces of said rollers for driving said rollers, and means for separating said chain from a predetermined group of said rollers at will.

6. A conveyer system comprising a plurality of metallic live rollers having non-metallic surfaces at one end thereof, and a common frictional driving means, comprising a driving chain having a plurality of links having flattened surfaces in frictional contact with the outer surfaces of said rollers, in contact with said surfaces for rotating said rollers.

7. A conveyer system comprising a plurality of live rollers having notched surfaces at one end thereof, common means, comprising a driving chain having a plurality of links having flattened surfaces in frictional contact with the outer surfaces of said rollers, engaging said surfaces for rotating said rollers, and means for increasing the frictional contact between said means and said rollers.

8. A conveyer system comprising a plurality of live rollers, and a driving chain having a plurality of links with flattened surfaces in frictional contact with the upper surfaces of said rollers, the weight of said chain serving to supply the friction necessary for driving engagement.

SMITH EGGLESTON.